2,960,348
Patented Nov. 15, 1960

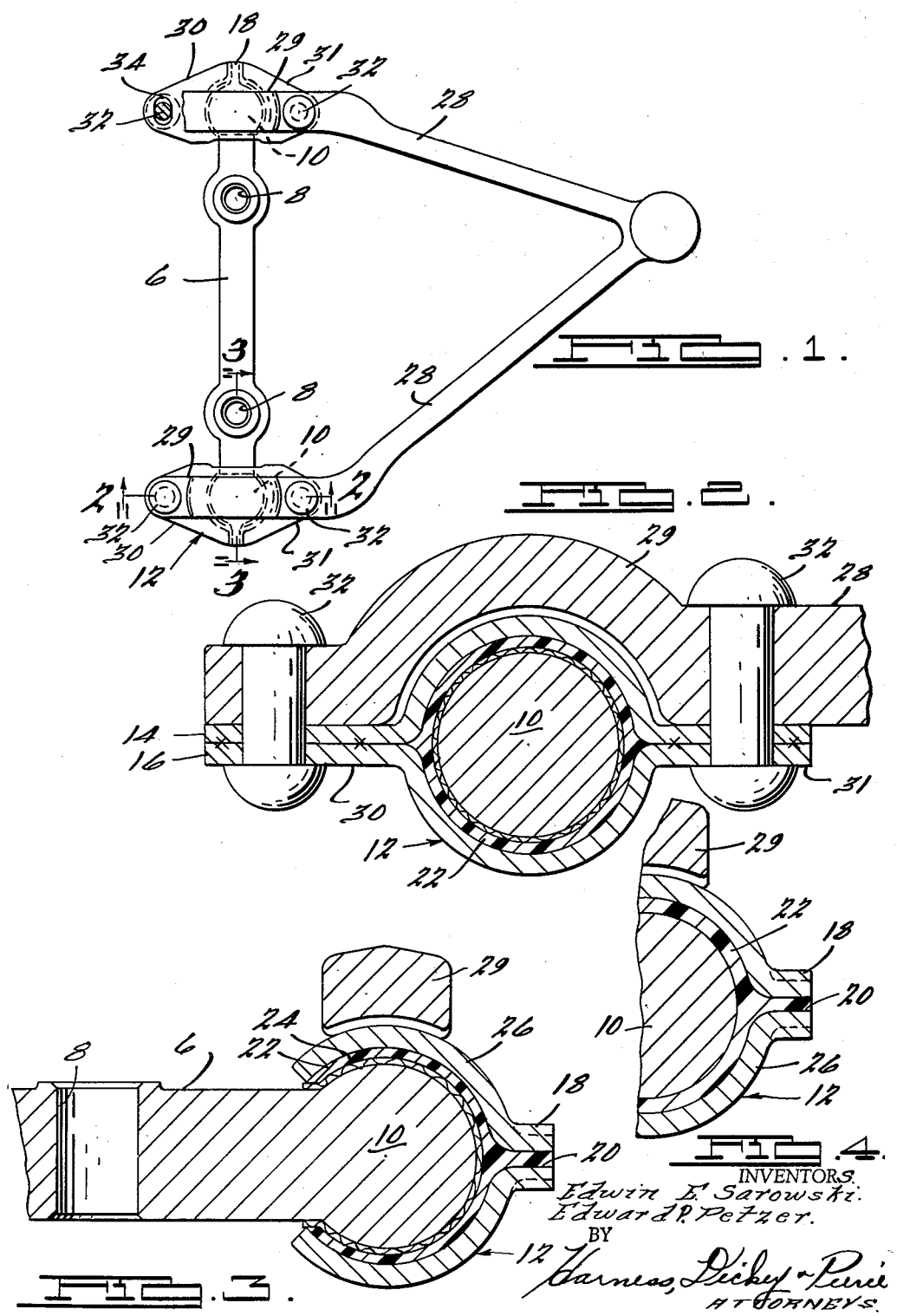

2,960,348

VEHICLE FRONT SUSPENSION ARM PIVOTED BY BALL JOINTS

Edwin E. Sarowski, Detroit, and Edward P. Petzer, St. Clair Shores, Mich., assignors to American Metal Products Company, Detroit, Mich., a corporation of Michigan Filed Aug. 7, 1957, Ser. No. 676,753

6 Claims. (Cl. 280—96.1)

This invention relates to ball type hinge elements and particularly to a ball type hinge element for an A-frame for supporting the front wheels of an automotive vehicle.

It is one object of the invention to provide a split housing adapted to fit over an enlarged ball on the end of a member in a manner to permit a hardenable cast material to be injected between the housing and the ball to form a low friction bearing surface therebetween, the housing providing a means for connecting a second member to the first member so as to permit universal movement between said members.

It is another object of the invention to provide ball joint hinge elements for the legs of an A-frame.

It is a further object of the invention to provide ball joint hinge elements for the legs of an A-frame comprising split housings adapted to fit over enlarged balls on the ends of a member with a hardenable cast material injected between the housings and the balls to form a low friction bearing surface.

It is a still further object of the invention to provide ball joint hinge elements for the legs of an A-frame comprising split housings adapted to fit over enlarged balls on the ends of a member with a Teflon bearing surface backed by pressure injected hardenable cast material disposed between the housings and the balls to form a low friction bearing surface.

It is a still further object of the invention to provide ball joint hinge elements for fastening the legs of an A-frame to a member which will compensate for variations in the distance between the legs.

It is a still further object of the invention to provide ball joint hinge elements for fastening the legs of an A-frame to a member which are relatively inexpensive to fabricate, effective in use, and rugged in construction.

Other objects and features of novelty of the invention will be specifically pointed out or otherwise become apparent when referring, for a better understanding of the invention, to the following description taken in conjunction with the accompanying drawing, wherein:

Figure 1 is a broken plan view of structure embodying features of the invention;

Fig. 2 is an enlarged sectional view of the structure illustrated in Fig. 1, taken along the line 2—2 thereof;

Fig. 3 is an enlarged sectional view of the structure illustrated in Fig. 1, taken along the line 3—3 thereof; and Fig. 4 is an enlarged sectional view of structure similar to that shown in Fig. 3 illustrating another form of the invention.

Referring to the drawing, one embodiment of the invention is comprised of an elongated member 6 having spaced apart apertures 8 therein to permit the member 6 to be bolted to the frame of an automotive vehicle. Enlarged balls 10 are provided on each end of the member 6 with a split housing 12 disposed over each of the balls. Each of the split housings 12 is comprised of two halves 14 and 16 having flanges 30 and 31 thereon which are welded or otherwise secured together.

An aperture 20 is formed between the flanges of each of the split housings to enable a hardenable cast backing material 22 to be injected therethrough so as to entirely fill the space between each of the balls and inner surface 26 of the housings which are preferably left in a roughened condition to prevent the material 22 from rotating relative thereto. As most clearly illustrated in Fig. 3, a layer of Teflon material 24 may be inserted between the cast backing material 22 and the balls to form a low friction bearing surface, the cast backing material serving to substantially perfectly conform the Teflon material to the surface of the ball and to provide a rigid backing therefor.

A number of materials are suitable for use as the cast backing material. Polyethylene molding compounds may be employed, two being procurable on the market, one under the name of Super-dyland, the other under the name of Marlex. Phenolic impregnated glass fibrous material procurable in the trade under the name of Durez, and a form of nylon material, procurable on the market under the name of Zytel, have also been employed, as well as, a phenolic and polyethylene impregnated glass fibrous material.

If desired, the Teflon material 24 may be dispensed with and the cast backing material itself may serve to provide the low friction bearing surface as most clearly illustrated in Fig. 4.

These resin materials will not produce the extreme low friction characteristics as does the Teflon material 24 but will produce a low friction oilless joint which performs satisfactorily under minimum movement and reasonable load conditions. Preferably, when the Teflon material 24 is not used, the surface of each of the balls 10 is preferably plated with nickel and a flash of chrome to rustproof the surface and eliminate the final honing operation. A rough honing operation to true form provides a satisfactory surface for the plating operation which produces a fine finish on the ball. Of course, other conventional methods for rustproofing the ball would also be satisfactory, and the above-described method is not intended to be limiting in any way. Since the balls are substantially of true spherical form and the hardenable cast material 22 is molded directly thereto, a complete area contact is provided between the balls 10 and the engaged surface of the material.

Referring to Fig. 1, it will be observed that legs 28 having parallel end portions 29 are secured to the flanges 30 and 31 of the housings 12 by suitable rivets 32, or the like, to form an A-frame construction for supporting the front wheels of an automotive vehicle.

In order to compensate for any variation in distance or slight misalignment between the parallel end portions 29 of the legs 28, one of the flanges 30 contains a slot 34 which enables the housing 12 and end portion 29 to pivot relative to one another about the rivet 32 which fastens the other flange 31 to the end portion 29 of the legs.

By virtue of this construction, the split housings 12 may be inserted over each of the balls 10 as described to make a complete unit which is adapted to have the legs 28 fastened directly thereto to form an A-frame. The legs 28 may be attached to the split housings 12 at the time of assembly of the automotive vehicle without regard to forming the bearing surface with the balls 10. This greatly simplifies the manufacturing and assembly procedures since it is much easier to mount the split housings on the balls than it is to attempt to mount the legs 28 directly on the balls.

Further, it is apparent that any variation in the distance between the end portions 29 of the legs 28 greatly complicates mounting the end portions on the balls 10. By providing the slot 34 to permit relative movement between one of the split housings and one of the end portions, the housing can shift to compensate for any such variations in distance to greatly facilitate the fastening of the end portions 29 to the housings.

What is claimed is:

1. An A-frame construction for supporting a front wheel of an automotive vehicle comprising two balls adapted to be mounted on and project from the frame of the vehicle, a housing having opposed laterally extending flanges rotatably mounted on each of the balls, the line passing between the centers of the balls lying substantially in the plane of said flanges, one of said flanges having a slot therein, and an A-frame having the legs thereof attached to the flanges of the housings with a pin and slot connection between the flange having the slot therein and the leg of the A-frame attached thereto, the opposed flange extending from the same housing as said one flange being pivotally connected to the A-frame.

2. An A-frame construction for supporting a front wheel of an automotive vehicle comprising an elongated member adapted to be attached to the frame of the vehicle having enlarged balls on either end thereof, a housing having opposed laterally extending flanges rotatably mounted on each of the balls, the axis of said member lying substantially in the plane of said flanges, an A-frame having substantially parallel extending leg portions, one of said leg portions being rigidly attached to the flanges of one of the housings, the other of the leg portions being attached to the flanges of the other of the housings with a pivotal connection between one of the flanges and the leg portion and a slot and pin connection between the other of the flanges and the leg portion.

3. An A-frame construction for supporting a front wheel of an automotive vehicle comprising an elongated member having enlarged balls on both ends thereof, a housing having laterally extending flanges disposed over each of said balls, the axis of the elongated member lying substantially in the plane of said flanges, one of the flanges of one of the housings having a slot therein with the remaining flanges having an aperture therein, a bearing liner positioned between each of the housings and the balls and conforming to the balls to provide a low friction bearing surface, and a pair of legs having the ends thereof fastened together with substantially parallel extending portions on the other ends thereof, said parallel portions of the legs being fastened to the housings by pin means passing through the apertures and slot in the flanges.

4. An A-frame construction for supporting a front wheel of an automotive vehicle comprising an elongated member having enlarged balls on both ends thereof, a housing having laterally extending flanges disposed over each of said balls, the axis of the elongated member lying substantially in the plane of said flanges, one of the flanges of one of the housings having a slot therein with the remaining flanges having an aperture therein, low friction bearing material disposed between the balls and the housings, backing material disposed between the housings and the low friction material for conforming the low friction material to the balls to provide a bearing surface, and a pair of legs having the ends thereof fastened together with substantially parallel extending portions on the other ends thereof, said parallel portions of the legs being fastened to the housings by pin means passing through the apertures and slot in the flanges.

5. An article of manufacture for hinging the legs of a A-frame to the chassis frame of an automotive vehicle comprising an elongated member adapted to be mounted on the frame of the vehicle and having enlarged balls on both ends thereof, a housing disposed over each of said balls having laterally extending flanges, the axis of the elongated member lying substantially in the plane of said flanges, one of said flanges having a slot therein with the remaining flanges having an aperture therein for receiving pin means to enable legs to be attached thereto, and hardenable backing material disposed between the housings and the balls and conforming to the balls to provide a low friction bearing surface.

6. An article of manufacture for hinging the legs of an A-frame to the chassis frame of an automotive vehicle comprising an elongated member adapted to be mounted on the frame of the vehicle and having enlarged balls on both ends thereof, a housing disposed over each of said balls having laterally extending flanges, the axis of the elongated member lying substantially in the plane of said flanges, one of said flanges having a slot therein with the remaining flanges having an aperture therein for receiving pin means to enable legs to be attached thereto, low friction bearing material disposed between the balls and the housings, backing material disposed between the housings and the low friction material to conform the low friction material to the balls to provide a bearing surface.

References Cited in the file of this patent

UNITED STATES PATENTS

| 601,013 | Evans | Mar. 22, 1898 |
|---|---|---|
| 1,881,601 | Hufferd et al. | Oct. 11, 1932 |
| 1,900,617 | Ricardo | Mar. 7, 1933 |
| 2,096,115 | Leighton | Oct. 19, 1937 |
| 2,424,914 | Brown | July 29, 1947 |
| 2,678,830 | Cigan et al. | May 18, 1954 |
| 2,737,398 | Mohr | Mar. 6, 1956 |
| 2,791,454 | Saives | May 7, 1957 |
| 2,797,930 | Booth | July 2, 1957 |
| 2,822,185 | Mineck | Feb. 4, 1958 |
| 2,827,303 | Herbenar | Mar. 18, 1958 |
| 2,835,521 | White | May 20, 1958 |
| 2,862,741 | Baker | Dec. 2, 1958 |

FOREIGN PATENTS

| 1,117,481 | France | Feb. 27, 1956 |